United States Patent
Umezaki et al.

(10) Patent No.: US 7,561,187 B2
(45) Date of Patent: Jul. 14, 2009

(54) IMAGE DISTRIBUTING APPARATUS

(75) Inventors: Yasushi Umezaki, Kawasaki (JP); Yuichi Terui, Kawasaki (JP); Syuichi Takayama, Kawasaki (JP); Mitsuyo Hasegawa, Kawasaki (JP); Yutaka Yaginuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 507 days.

(21) Appl. No.: 11/031,583

(22) Filed: Jan. 7, 2005

(65) Prior Publication Data
US 2006/0015554 A1 Jan. 19, 2006

(30) Foreign Application Priority Data
Jul. 14, 2004 (JP) .............................. 2004-207328

(51) Int. Cl.
H04N 5/232 (2006.01)
H04N 7/00 (2006.01)
(52) U.S. Cl. ...................... 348/211.3; 348/37; 348/39
(58) Field of Classification Search .................. 348/36, 348/37, 39, 143, 207.1, 211.3; 352/69, 70
See application file for complete search history.

(56) References Cited

U.S. PATENT DOCUMENTS

| | | | | |
|---|---|---|---|---|
| 5,650,813 A | * | 7/1997 | Gilblom et al. | 348/36 |
| 5,790,183 A | * | 8/1998 | Kerbyson | 348/37 |
| 6,034,716 A | * | 3/2000 | Whiting et al. | 348/36 |
| 6,665,003 B1 | * | 12/2003 | Peleg et al. | 348/36 |
| 6,839,067 B2 | * | 1/2005 | Liu et al. | 345/647 |
| 6,982,749 B2 | * | 1/2006 | Matsui | 348/218.1 |
| 2004/0201713 A1 | * | 10/2004 | Matsui | 348/218.1 |
| 2005/0062845 A1 | * | 3/2005 | Mills | 348/36 |

FOREIGN PATENT DOCUMENTS

JP 11-313304 11/1999
JP 2003-037831 2/2003

OTHER PUBLICATIONS

"Generation of Perspective and Panoramic Video from Omnidirectional Video", Venkata Peri and Shree Nayar, Proc. of DARPA Image Understanding Workshop, May 1997.*
R. Colin Johnson, "Panoramic Camera Puts Viewer at live Netcasts," EE Times, Sep. 28, 1998.*

* cited by examiner

Primary Examiner—Tuan V Ho
Assistant Examiner—Dennis Hogue
(74) Attorney, Agent, or Firm—Katten Muchin RosenmanLLP

(57) ABSTRACT

To provide a technology for easily distributing an image in a requested photograph direction. Photograph images, which are photographed by turning a photographing apparatus and continuously photographing the periphery of the photographing apparatus, are stored in a storing region. Any direction in a photograph range of the photographing apparatus is specified and a distribution request of an image photographed in the specified direction is received. A reading start position on one image is determined from the continuous photograph images in accordance with the specified direction of the distribution request. A part of the photograph image is read out from the start position as a distribution image. The distribution images are read out from the positions moved correspondingly to the turns from the start position on the image following the photograph image. The distribution images are distributed to request destinations of the distribution requests.

10 Claims, 12 Drawing Sheets

FIG. 5
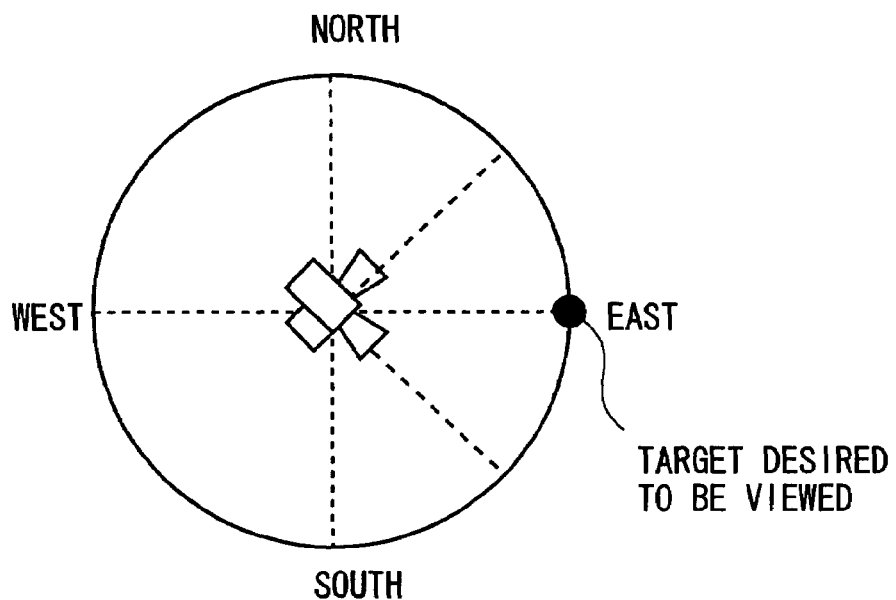
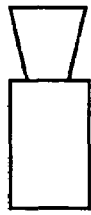 CAMERA SPECIFICATION
PHOTOGRAPH IMAGE ANGLE = $\alpha$ (90° IN EXAMPLE)
ROTATION ANGLE SPEED = $\theta$ (6°/SEC IN EXAMPLE)
TIME WHILE STANDARD SIZE FRAME IS PERFECTLY PHOTOGRAPHED
= $\alpha/2\theta$
CYCLE WHEN TARGET IS PHOTOGRAPHED = $360/\theta$

IMAGE DISTRIBUTING APPARATUS

BACKGROUND OF THE INVENTION

The present invention relates to a technology for distributing an image photographed at a remote location.

Advancement of an IP network toward a broad band in recent years has increased a number of services of rich contents in a world size. An image distribution service of a live camera through WWW is one of the services. Now, a system using a live camera and an image distributing server exists all over the world, and a user who is a client can receive the image distribution by accessing the camera. Also, recently, the number of systems has been increasing in which control of a camera can be remotely executed, such as the control of a photograph direction of a camera or the control of zoom-in/zoom-out.

As the prior art relating to this application invention, for example, there is a technology disclosed in the following patent document 1 or 2.

[Patent document 1] JP 2003-37831 A
[Patent document 2] JP 11-313304 A

SUMMARY OF THE INVENTION

An image distributing system of a high added value that can control a photograph direction and a zoom as described above is a useful system that can remotely grasp a situation of an actual location. However, when accesses are concentrated on one camera, acquisition of a control right is difficult. Difficulty thereof results in a problem in that when each user desires to view an image in the photograph direction desired by him or her, the image cannot be immediately viewed. Also, even if the camera is turned in the photograph direction desired to be viewed after the acquisition of the control right, when the control right is immediately given to a different person, the photograph direction is changed. The change results in a problem in that the image cannot be sufficiently viewed.

Other than the method of controlling the photograph direction of the camera as described above, there is such a service that distributes an image where a wide range is photographed by using a fisheye lens camera, in order to consent to a multi access request (FIG. 11). Although the optically distorted image can exhibit the schematic ambience of a spot, the grasping of the accurate environment is difficult. The difficulty results in a problem in that the image is not suitable for selecting and observing a particular target (or a particular angle) (FIG. 13).

Other than the fisheye lens, there is a panorama camera (FIG. 12) that can photograph 360° in single shot by using a full circle lens which uses the refraction through a lens or the reflection through a mirror, However, the photograph image is distorted larger than the image of a camera that uses a fisheye lens (FIG. 14). The image results in a similar problem.

Also, in an image distributing service that uses a fisheye lens camera or a full circle lens camera, a system is considered which carries out a digital distortion compensation for the distorted entire scene image and distributes the image (FIG. 15) after the compensation. However, the distributing server needs to carry out an individual distortion compensation operation for each received request. Thus, if the accesses are concentrated, the load on the operation process becomes very high. Therefore, there arises a problem in that the system is not actual.

Moreover, because of the transmission delay between a camera and a control person who is remotely located, it is difficult to adjust the angle of the camera so as to photograph an intended position (this requires the operation or camera control mechanism where the transmission delay is considered). The difficulty is the problem of the conventional remote camera control.

In this way, under the current situation, there are several problems to attain an image distributing service for clearly distributing an image in any specified direction without the distortion, from the photograph region of a wide range (for example, 360°).

In view of the above, the present invention provides a technology for easily distributing an image in a requested photograph direction.

According to one aspect of the present invention, there is provided an image distributing apparatus, including:

an image register storing photograph images, which are photographed by turning a photographing apparatus and continuously photographing the periphery of the photographing apparatus, in a storing region;

a request receiver receiving a distribution request of an image photographed in the specified direction, which is specified any direction in a photograph range of the photographing apparatus;

a reader determining a reading start position on one image, from the continuous photograph images, in accordance with the specified direction of the distribution request, and reading out a part of the photograph image from the start position as a distribution image, and also reading out the distribution images from the positions moved correspondingly to the turns from the start position on the image following the photograph image; and a distributor distributing the distribution images to request destinations of the distribution requests.

In further aspect of the image distributing apparatus:
the image register may store the photographed images in addresses of the storing region correlated to the photograph directions; and the reader may determine a reading start address on the storing region as the reading start position, and determine an address that is different correspondingly to the turn from the start address, and read out the distribution images from those addresses.

In further aspect of the image distributing apparatus:
the reader may store the plurality of reading start positions correspondingly to a plurality of distribution requests, and read out the distribution images related to the plurality of reading start positions; and the distributor may distribute the plurality of distribution images to the respective request destinations.

In further aspect of the image distributing apparatus, the image resister may over write and record the photograph images to the storing region at the turn unit.

According to another aspect of the present invention, there is provided an image distributing method, including the steps of:

storing photograph images, which are photographed by turning a photographing apparatus and continuously photographing the periphery of the photographing apparatus, in a storing region;

receiving a distribution request of an image photographed in the specified direction, which is specified any direction in a photograph range of the photographing apparatus;

determining a reading start position on one image, from the continuous photograph images, in accordance with the specified direction of the distribution request, and reading out a part of the photograph image from the start position as a distribution image, and also reading out the distribution images from the positions moved correspondingly to the turns from the start position on the image following the photograph image; and distributing the distribution images to request destinations of the distribution requests.

In further aspect of the image distributing method:

at the step of storing the images, the photographed images may be stored in addresses of the storing region correlated to the photograph directions; and at the step of determining a reading start address on the storing region as the reading start position, and determine an address that is different correspondingly to the turn from the start address, and read out the distribution image from those addresses.

In further aspect of the image distributing method:

at the step of reading out the distribution image, the plurality of reading start positions may be stored correspondingly to a plurality of distribution requests, and the distribution images related to the plurality of reading start positions may be read out; and at the step of distributing the distribution images, the plurality of distribution images may be distributed to the respective request destinations.

In further aspect of the image distributing method, at the step of registering the photograph images, the photograph images may be overwritten and recorded to the storing region at the turn unit.

According to another aspect of the present invention, there is provided an image distributing system having a photographing apparatus that is turnably placed and an image distributing apparatus for distributing an image photographed by the photographing apparatus through a network, in which the photographing apparatus includes:
a photographing device continuously photographing an image;
a turning device turning a photograph direction; and
an output device outputting a photograph image to the image distributing apparatus, and in which the image distributing apparatus includes:
an image register storing photograph images of the photographing apparatus in a storing region;
a request receiver specifying any direction in a photograph range of the photographing apparatus and receiving a distribution request of an image photographed in the specified direction;
a reader determining a reading start position on one image, from the continuous photograph images, in accordance with the specified direction of the distribution request, and reading out a part of the photograph image from the start position as a distribution image, and also reading out the distribution images from the positions moved correspondingly to the turns from the start position on the image following the photograph image; and
a distributor distributing the distribution images to request destinations of the distribution requests.

Also, the present invention may be an image distribution program for instructing a computer to execute the respective steps in the image distributing method.

Moreover, the present invention may be a recording medium in which the program is recorded so as to be readable by the computer. Then, the function of the program can be provided by inputting the program in the recording medium to the computer and instructing the execution.

Here, the recording medium readable by a computer implies a recording medium that can accumulate information such as data or a program through an electric, magnetic, optical, mechanical, or chemical action and read it from the computer. Of the recording media, examples of a device that can be removed from a computer include a flexible disc, a magneto-optic disc, CD-ROM, CD-R/W, DVD, DAT, an 8 mm tape, and a memory card.

Also, examples of a recording medium fixed to a computer include a hard disc and ROM (Read Only Memory).

According to the present invention, there is provided a technology for easily distributing an image in a requested photograph direction.

DESCRIPTION OF THE DRAWINGS

FIG. 5 is an explanation view of a photograph condition.

DETAILED DESCRIPTION OF THE PREFERRED EMBODIMENT

The best mode of carrying out the present invention will be described below with reference to the drawings. The following configurations of the embodiments are only the exemplifications, and the present invention is not limited to the configurations of the embodiments.

First Embodiment

Figure 1:
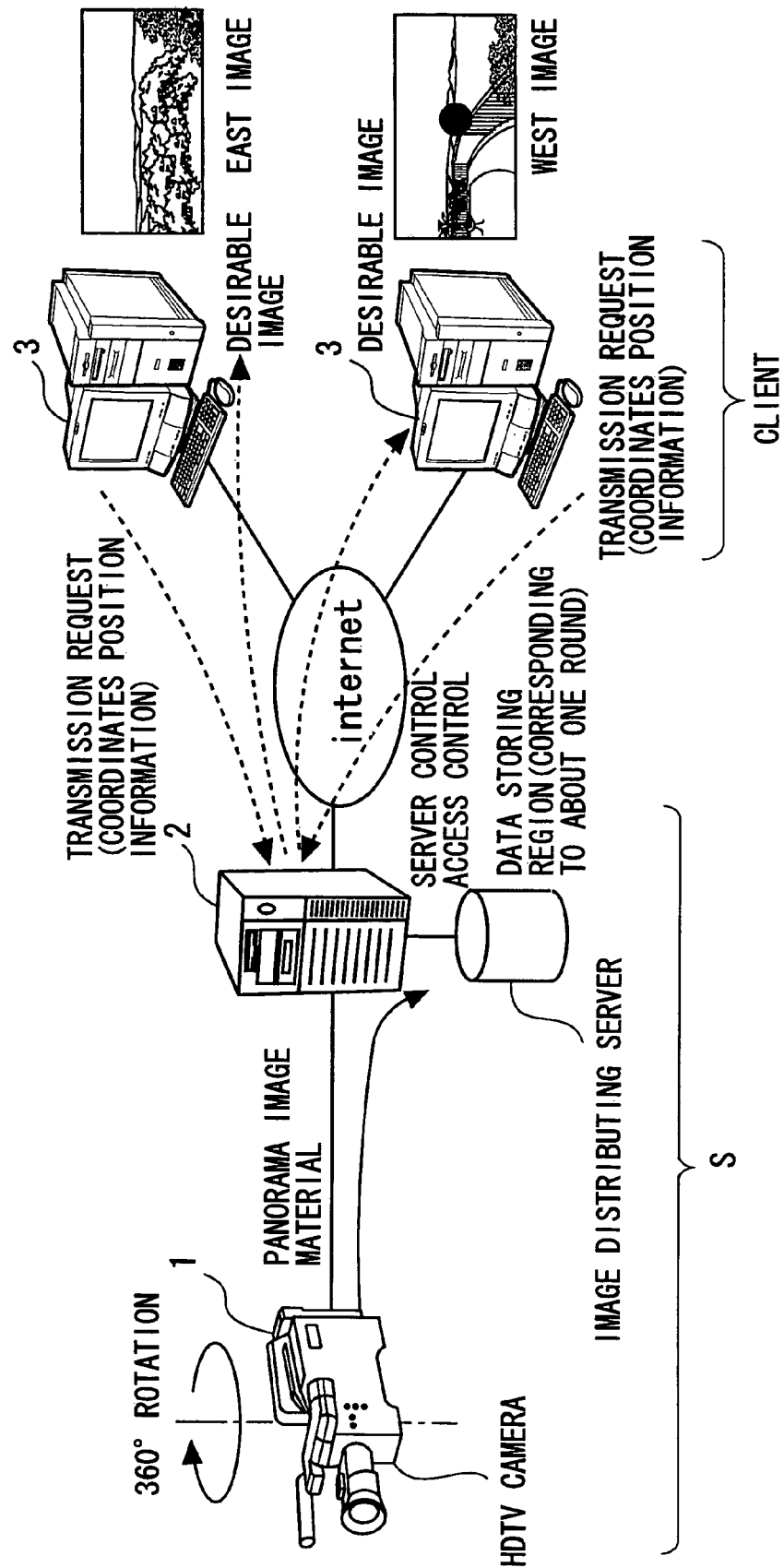
FIG. 1 is a configuration view of an image distributing system.

FIG. 1 is a configuration view of an image distributing system S according to the present invention. This embodiment is the system, in which an image photographed by a live camera (photographing apparatus) 1 placed at a scenic resort or theme park is accumulated in a buffer of an image distributing server (image distributing apparatus) 2, and the image photographed in a specified direction is cut away from the buffer and distributed through the Internet to a client 3.

Figure 2:
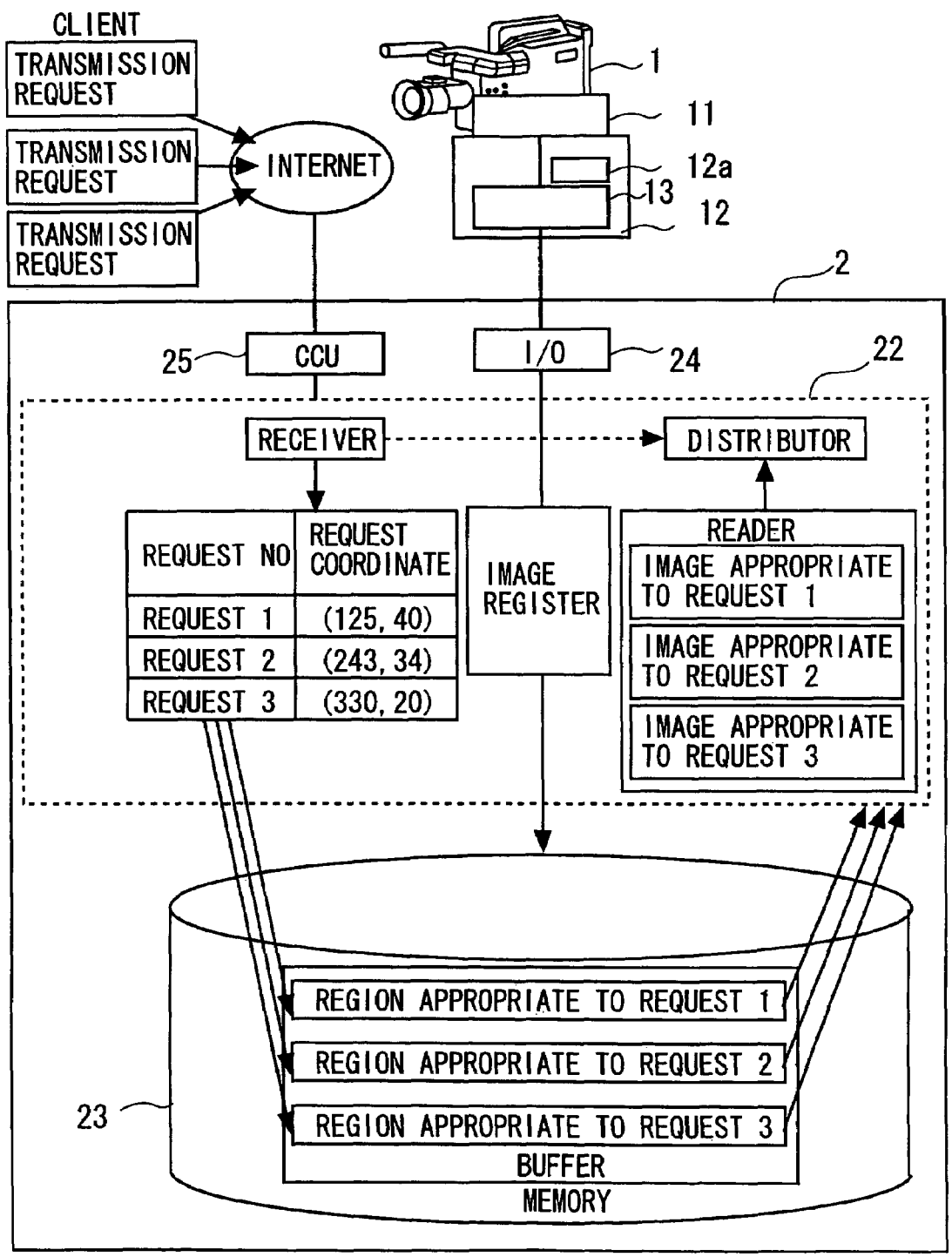
FIG. 2 is an explanation view of a live camera and an image distributing server.

FIG. 2 is an explanation view showing the components of the live camera and an image distributing server.

As shown in FIG. 2, the live camera 1 has: a photographing device 11 for continuously photographing an image; a turning device 12 for turning a photograph direction; and an output device 13 for transmitting the photograph image to the image distributing apparatus. A camera in this embodiment is a so-called HDTV (High Definition TV) camera, and one image (frame) is photographed at 1,920 (horizontal)×1,035 (vertical) pixels. Also, the camera 1 photographs the periphery of the camera at 360° because the turning device 12 turns at a predetermined angle speed (in this embodiment, 6°/sec), and the photograph image is transmitted to the image distributing server 2.

In this embodiment, the turning device 12 has an absolute type encoder 12a and detects the angle at which the camera 1 is oriented, namely, the information (angle information) indicating the photograph direction. The output device 13 outputs the angle information indicating the photograph direction of the image together with the photograph image to the image distributing server 2. The angle information may be added for each image (frame), or may be added at a predetermined interval, such as 0°, 90°, 180°, or 270°, and the frame between them may be obtained by counting the number of the frames. Also, when a time of a photographed point is 0 sec, the angle is 0°, and in a case of 30 seconds, it is 180°. The synchronization of the turning is set such that the camera is oriented in a predetermined direction at a predetermined time. The camera 1 side may not send the angle information. Then, the server 2 side may judge the photograph direction from the photograph time.

The image distributing server 2 is a typical computer including an operation processor 22 composed of a main memory and CPU, a memory (hard disc) 23, an input/output device (I/O) 24, and a communication controller (CCU) 25.

The memory device 23 stores the images from an operation system, an application program (image distribution program or the like), and the live camera 1.

The live camera 1 is connected to the input/output device 24, and the photograph image is inputted. Also, output devices such as a display (displaying device) and a speaker and input devices such as a keyboard and a microphone are connected to the input/output device 24, as necessary.

The operation processor 22 properly reads out and executes the program stored in the memory device 23 and consequently carries out the distributing process for the image and the like. In particular, in the embodiment, the operation processor 22 executes the respective steps of the image distribution program and consequently functions as an image register, a request receiver, a reader, and a distributor.

The image register overwrites the photograph image, in which the periphery of the live camera 1 is continuously photographed, to the memory device 23 for each turn and stores therein. In this embodiment, a predetermined region inside the memory device 23 is used as a buffer for the image, and this buffer stores the photograph image corresponding to one turn of the live camera 1. Also, the image stored in the buffer may be an image for a multiple of turns, such as for each two turns or for each 0.5 turn.

The request receiver receives, from the client 3, the distribution request of the photograph image in the specified direction, which is arbitrarily specified by a user, in the photograph range based on the photographing apparatus 1.

The reader determines the reading start position of one image, among the photograph images in the photographing apparatus 1, in accordance with the specified direction of the distribution request, and reads out a part of the image from this start position as the distribution image, and also reads out the distribution images from the positions moved correspondingly to the turns from the start position on the image following the photograph image. The distributor distributes the distribution image to the request designation of the distribution request.

Figure 3:
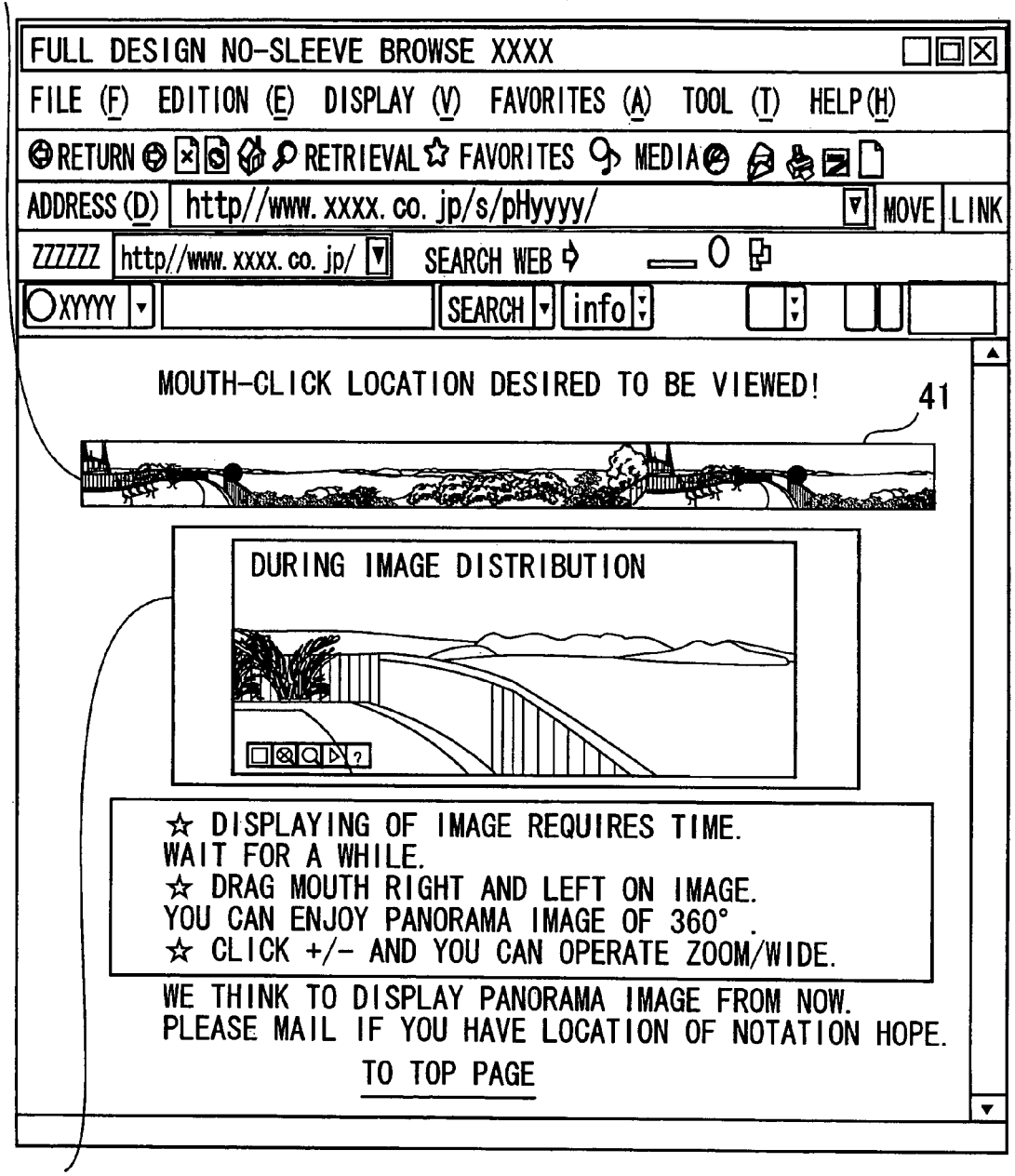
FIG. 3 is a view showing a screen displaying example of a Web browser.

Also, the client 3 is a typical personal computer (PC) connected to the Internet. The client 3 uses the function of the so-called Web browser to transmit the distribution request to the server 2 and also displays the information distributed from the server 2 on a displaying device. FIG. 3 is a displaying screen example of the Web browser and shows a specification screen to specify the direction desired to be viewed.

Figure 4:
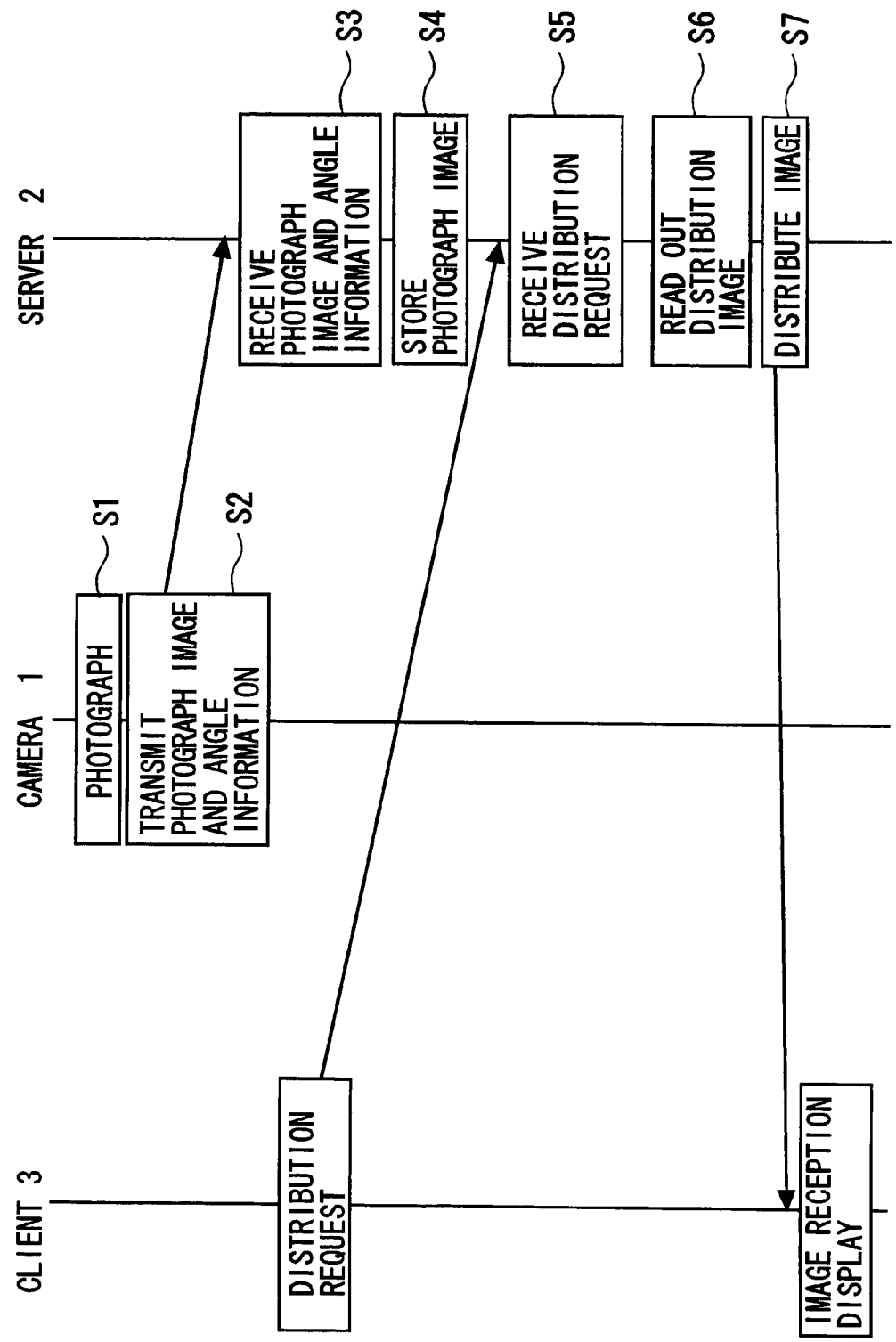
FIG. 4 is an explanation view of an image distributing method.
Figure 6:
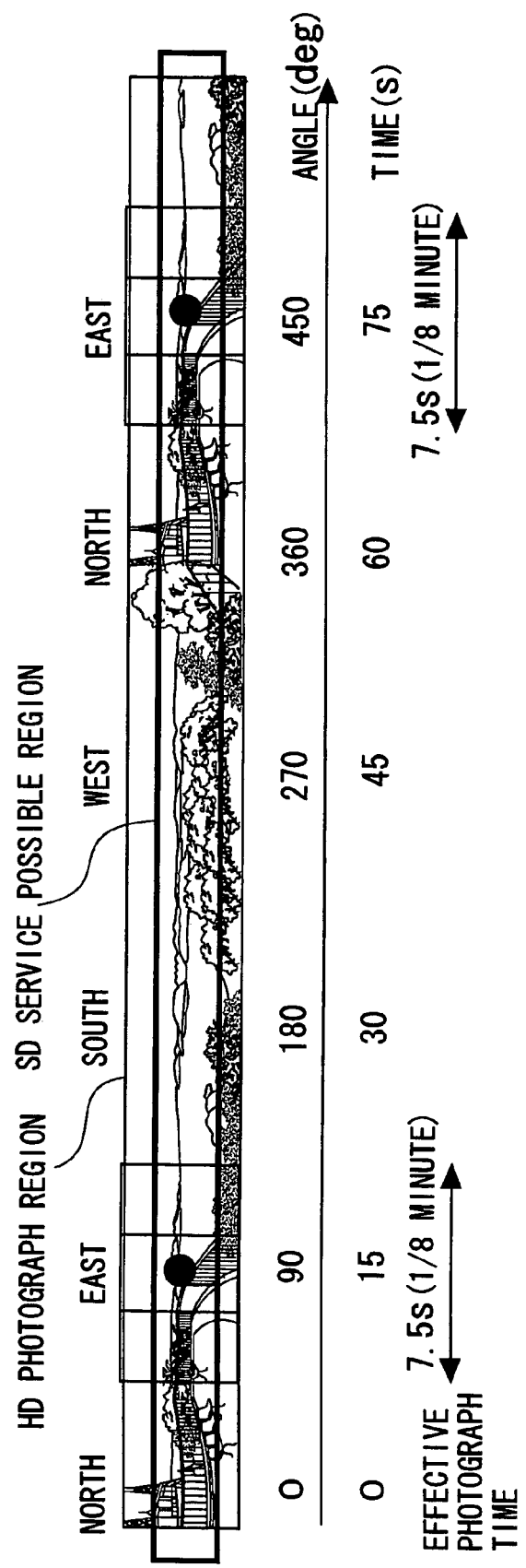
FIG. 6 is a view showing an entire photograph range.
Figure 7:
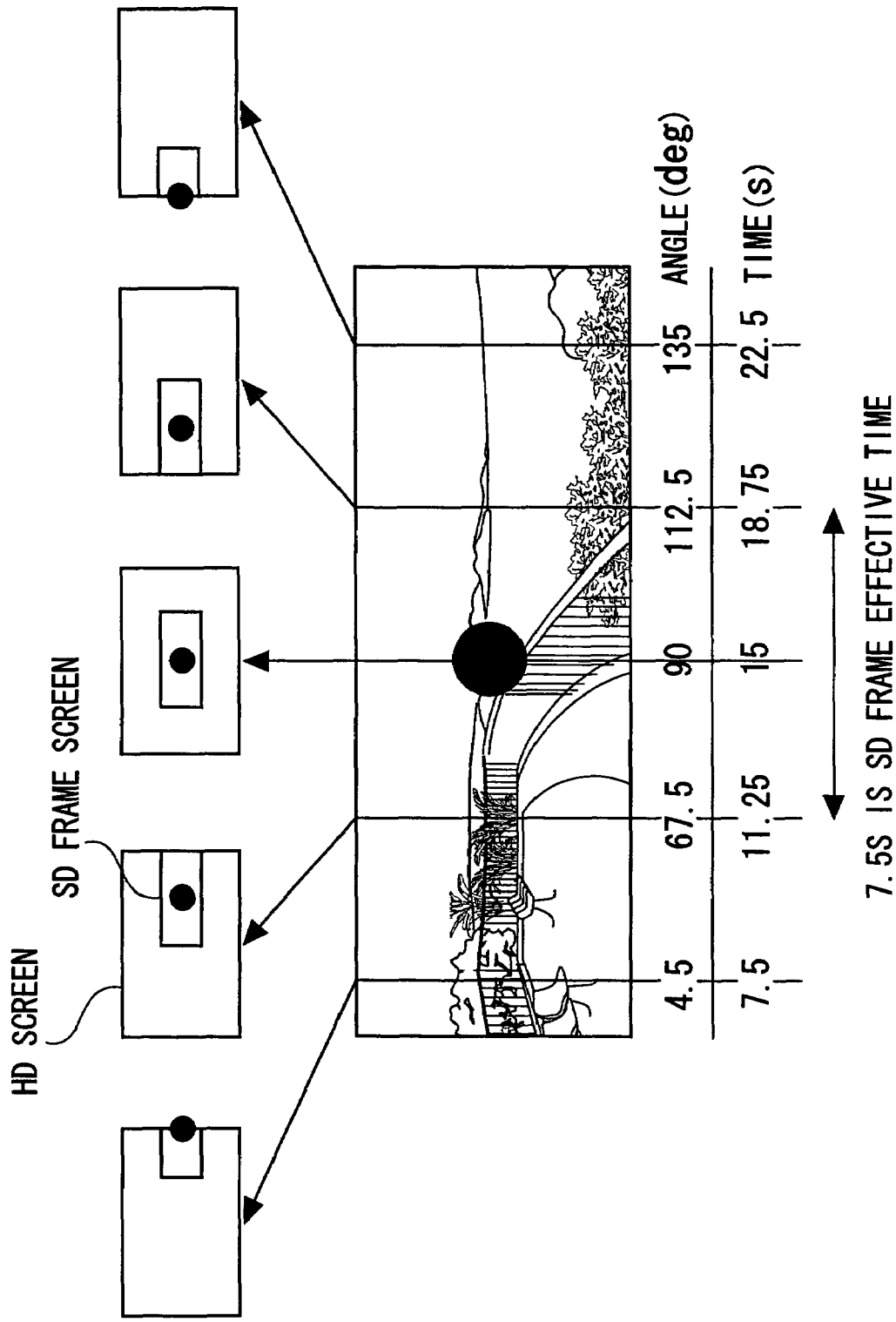
FIG. 7 is an explanation view of an HD screen and an SD screen.
Figure 8:
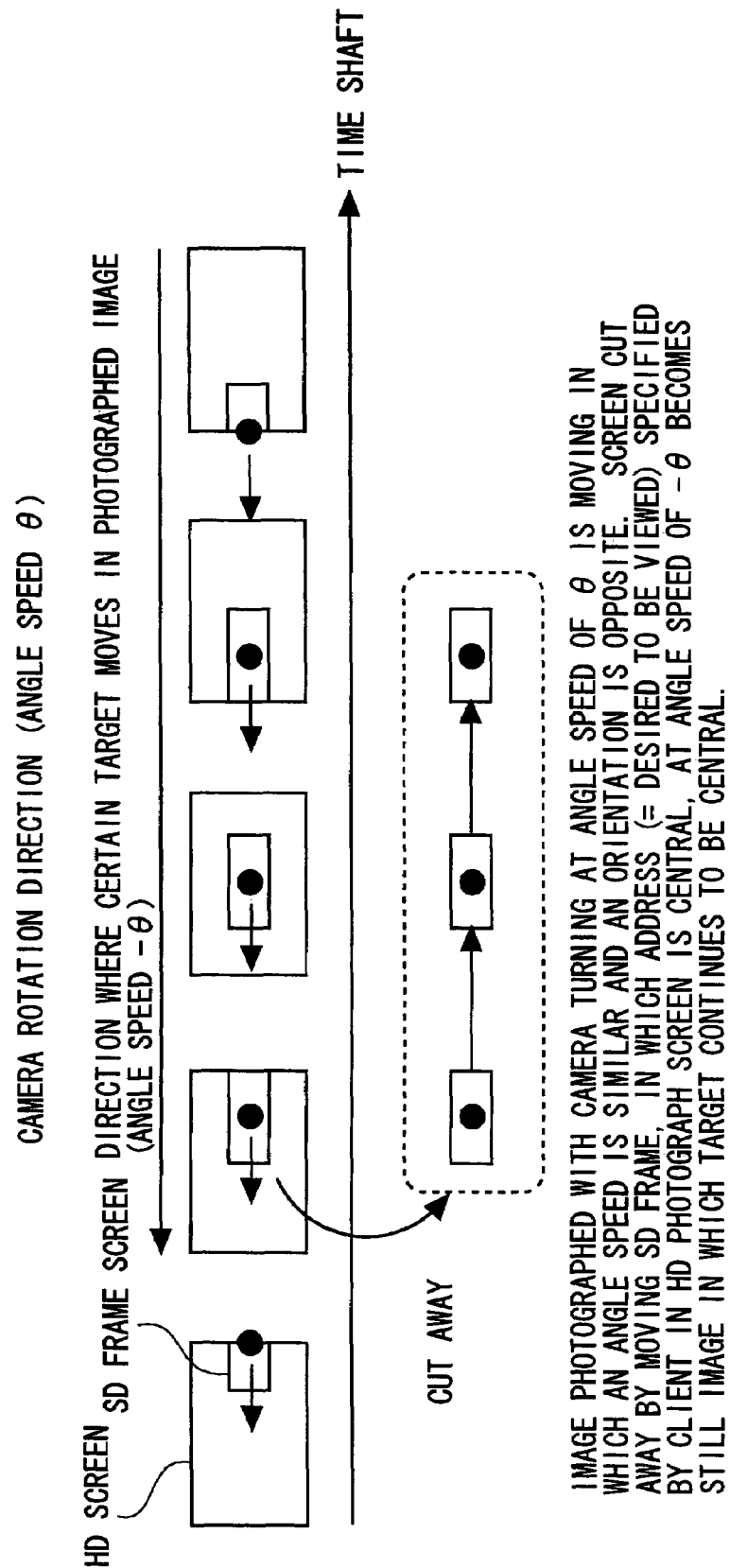
FIG. 8 is an explanation view of cutting away an SD screen.

The image distributing method based on the image distributing system of the configuration will be described below with reference to FIG. 4.

The live camera 1 is turned at 6°/sec so that the periphery of the photographing apparatus is continuously photographed at 30 frames per second (Step 1, hereafter, abbreviated as S1), and the photograph images together with the angle information are transmitted to the image distributing server 2 (S2).

The image distributing server 2 receives the photograph images and the angle information (S3) and stores them in the buffer of the memory device 23 (S4). At this time, the image register stores the photograph images in the addresses of the storing region correlated to the photograph directions. In this embodiment, the north is assumed to be 0°, and the photograph image when the live camera 1 is oriented in a direction of 0° is stored in and after an address X, and a next photograph image, namely, a photograph image photographed in a direction of 0.2° is stored in an address X+γ (γ is the bit number per frame), and a further next photograph image, namely, a photograph image photographed in a direction of 0.4° is stored in an address X+2γ, and the other images are sequentially stored in the same manner as that described above. Consequently, for example, in the east image, the photograph direction becomes 90°.

$$\text{Address} = X + (\text{Specified Direction}/\text{Turn Unit}) \times (\text{Time Necessary for Turn}) \times (\text{frame Rate}) \times \gamma \quad \text{(Equation 1)}$$

$$= X + (90/360) \times 60 \times 30 \times \gamma$$

$$\therefore \text{Address } X + 450\gamma$$

Thus, it is known that the east photograph image is stored in and after the address $X+450\gamma$.

Then, when the user of the client 3 operates the client 3, connects to the image distributing server 2, and displays the web page of FIG. 2 and then uses a mouth to click the point (specified direction) desired to be viewed by the user from a panorama image 41 pasted on this page, the client 3 transmits the angle information of this clicked position as distribution request information to the server 2.

When receiving the distribution request of the image photographed in the specified direction (S5), the image distributing server 2 determines the reading start position on one image among the continuous photograph images in accordance with the specified direction of the distribution request. In this example, it is photographed by means of the HDTV camera 1, and the image (SD image) of an area ratio of about ¼ of the photograph image (HD screen) is cut away and distributed as the distribution image.

This embodiment is defined as shown in FIG. 5 to FIG. 8:
Screen Angle α of Camera 1=90°;
Rotation Angle Speed=6°/s;
Time for Camera to Go Around Once=360/θ, (in Example, 60 sec); and
Time for Camera to Capture Target (East Target Sample) within Screen=α/θ, (in Example, 15 sec)

Thus, the SD screen with the specified direction (90°) as a center exists on the HD screen that is turned at the rotation angle speed θ, for α/2θ=7.5 sec, between the camera rotation angles 67.5° and 112.5°. In view of the above, the SD screen is cut away from the HD screen for the 7.5 seconds, namely, 225 HD screens, and distributed.

As described above, the address at which the HD screen (the image in the photograph direction of 67.5°) where the SD screen is placed at the farthest end is stored is obtained from the equation 1, and the address (the reading start position) where the SD screen is stored is obtained from the ratio between the HD screen and the SD screen.

Then, on the HD screen following the HD screen, respectively, the SD screen is captured at the position that is moved by −θ corresponding to the turn from the reading start position. Thus, the address of the position that is moved by −θ corresponding to the turn from the address is obtained.

The reader of the image distributing server 2 reads out the respective SD screens (the distribution images) from those addresses (S6), and the distributor generates streaming data for the distribution from those SD screens and distributes to the client of the request destination. In this embodiment, the SD screen cut away from the HD screen for 7.5 seconds (⅛ minute) is transmitted as the streaming data for one minute which is 8 times as long as 7.5 seconds. Then, within the one minute, the photograph image being buffered is updated to the real time information. Thus, after the update, the streaming data for a next one minute is generated and transmitted.

Figure 9:
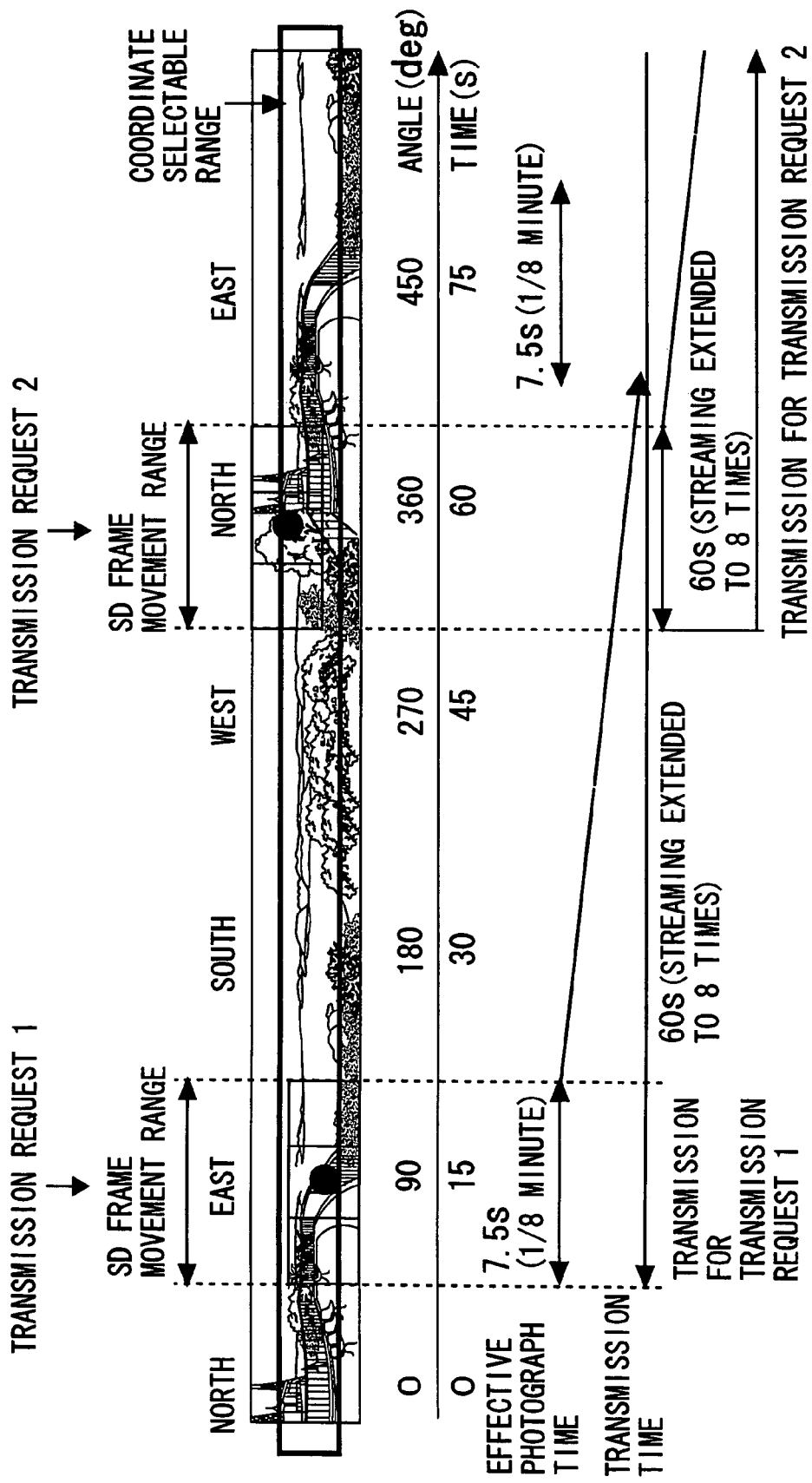
FIG. 9 is a view showing a plurality of accesses and a transmission example.

Also, if the distribution requests are received from a plurality of clients 3, a plurality of read out positions are stored as shown in FIG. 9, and the distribution images are cut away and distributed in accordance with the respective read out positions.

In this way, according to this embodiment, the image is photographed by means of the camera that is always turning, and the distribution image in the specified direction is cut away from the photograph image and distributed. Thus, for the distribution requests from the plurality of clients 3, the distribution images in the respective specified directions can be distributed at the same time. Also, in this embodiment, the image is photographed by the HD camera of a high precision, and the SD screen is cut away and distributed. Hence, without any necessity of the complex process such as distortion compensation or synthesis, the image distribution to the plurality of clients 3 can be easily attained.

Second Embodiment

Figure 10:
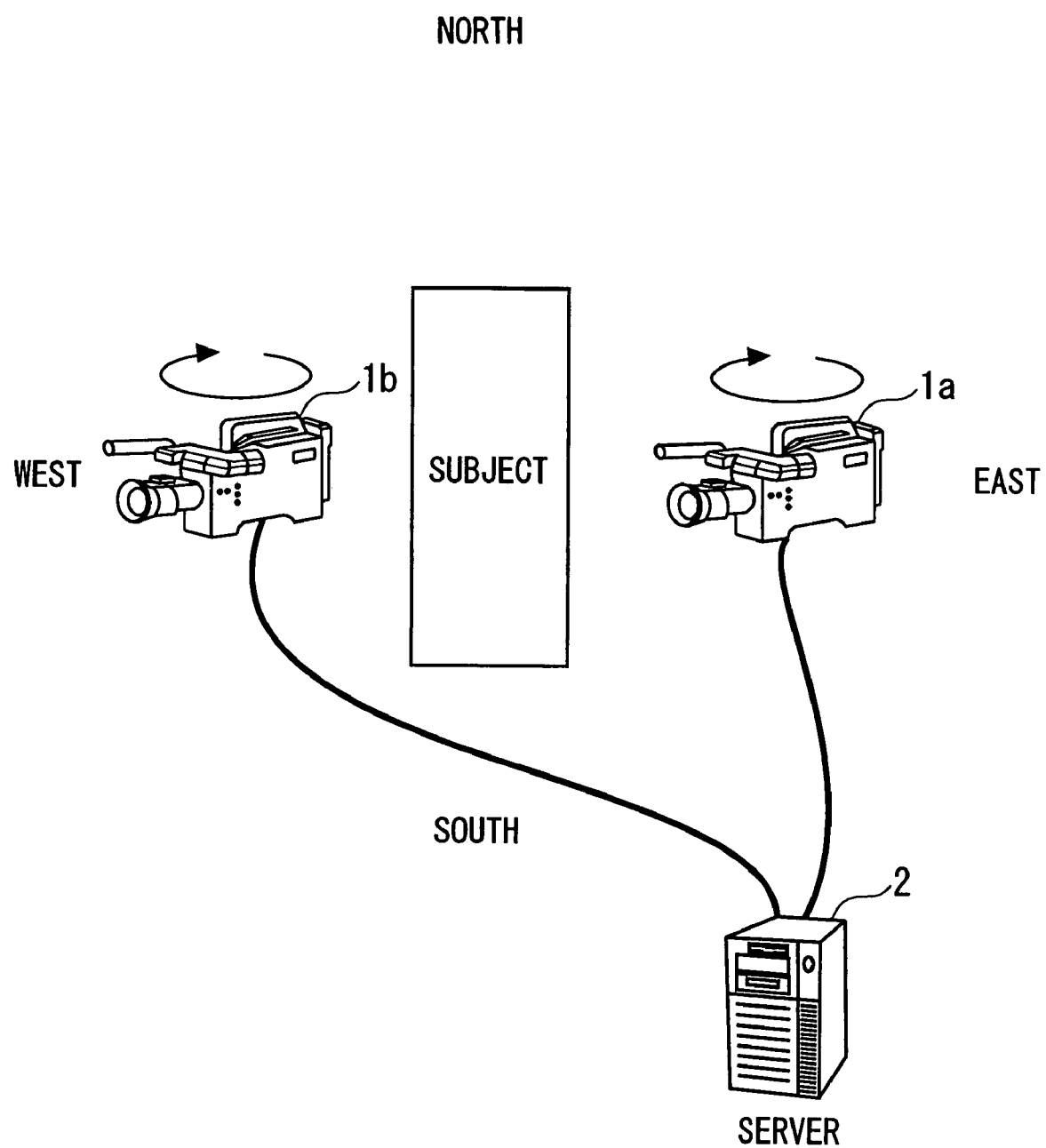
FIG. 10 is a schematic configuration view of an image distributing system of a second embodiment.
Figure 11:
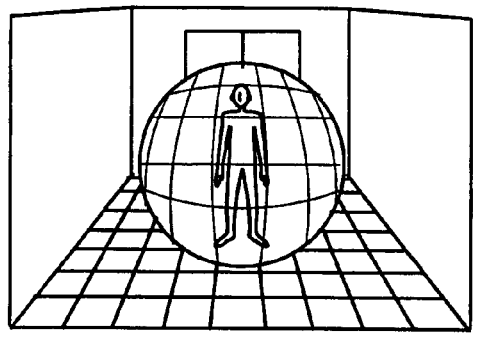
FIG. 11 is an explanation view of a photograph range of a fisheye lens camera.
Figure 12:
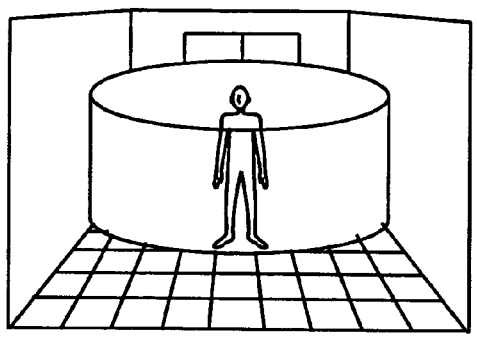
FIG. 12 is an explanation view of a photograph range of a full circumference camera.
Figure 13:
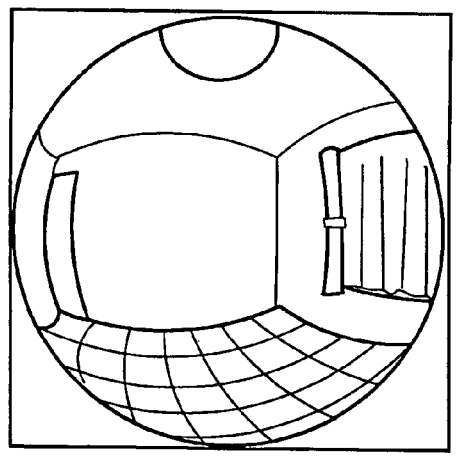
FIG. 13 is a view showing a photograph image of a fisheye lens camera.
Figure 14:
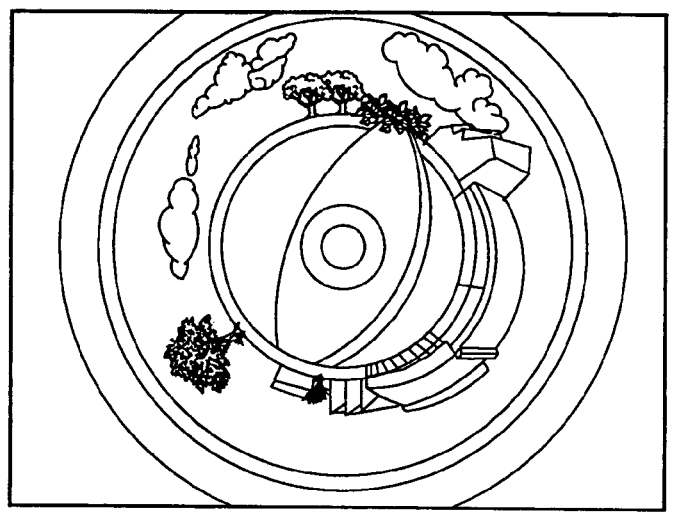
FIG. 14 is a view showing a photograph image of a full circumference camera.
Figure 15:
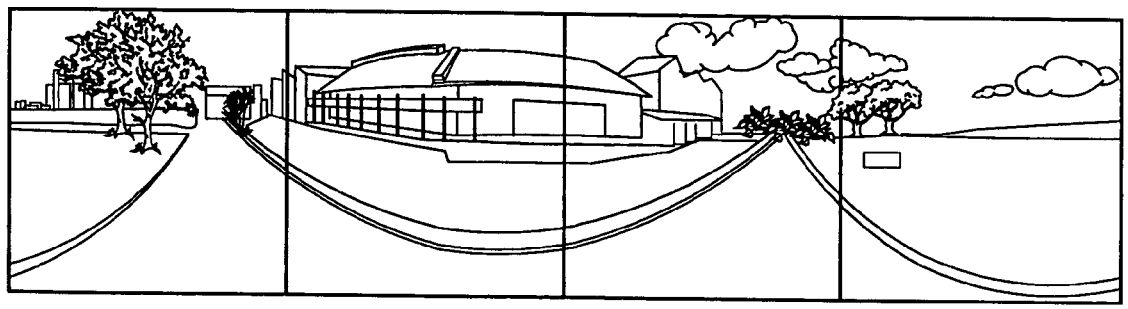
FIG. 15 is a view showing a post-compensation for a photograph image of a full circumference camera.

FIG. 10 is a configuration view of an image distributing system S in the second embodiment according to the present invention. This embodiment differs from the first embodiment in that there are a plurality of photographing apparatuses, and the other configurations are the same. Thus, the same symbols are given to the same members, and the re-explanations are omitted.

As shown in FIG. 10, in this embodiment, a camera 1a is placed on the east side with respect to a subject, and a camera 1b is placed on the west side with respect to the subject. Then, a photograph image between 0° and 180° that is photographed by the camera 1b is accumulated in the image distributing server 2, and a photograph image between 180° and 360° which is photographed by the camera 1a is accumulated in the image distributing server 2.

The procedure for receiving the distribution request about the accumulated photograph image between 0° and 360° and reading out and distributing the distribution image in accordance with the specified direction is equal to the above-mentioned procedure.

ANOTHER EMBODIMENT

The present invention is not limited to the illustrated examples. Naturally, various modifications can be executed in the range without departing from the scope of the present invention.

What is claimed is:

1. An image distributing apparatus, including:
   an image register storing photograph images that are photographed by rotating a photographing apparatus and continuously photographing a periphery of the photographing apparatus, wherein each photograph image corresponds to a photographing direction and has a first angle of view, wherein each photograph image overlaps a preceding photograph image and a subsequent photograph image, at an angle of view which is larger than a second angle of view of distribution images;
   a request receiver receiving a distribution request which specifies any direction in the periphery of the photographing apparatus as a specified direction, wherein the specified direction corresponds to a selected viewing region of the periphery of the photographing apparatus;
   a reader reading out the distribution images in accordance with the specified direction of the distribution request, wherein the distribution images have the second angle of view smaller than the first angle of view, wherein the distribution images are image data for the selected viewing region extracted from each photograph image that contains image data for the selected viewing region, wherein distribution images corresponding to the same selected viewing region are read out from photograph images having different photographing directions; and
   a distributor distributing the distribution images to request destinations of the distribution requests.

2. The image distributing apparatus according to claim 1, in which:
   the reader stores a plurality of reading start addresses corresponding to a plurality of distribution requests, and reads out the distribution images related to the plurality of reading start addresses; and
   the distributor distributes the plurality of distribution images to the respective request destinations.

3. The image distributing apparatus according to claim 1, in which the image register overwrites and records the photograph images to the storing region per one turns of a multiple of turn by the photographing apparatus.

4. An image distribution method, including the steps of:
   storing photograph images that are photographed by rotating a photographing apparatus and continuously photographing a periphery of the photographing apparatus, wherein each photograph image corresponds to a photographing direction and has a first angle of view, wherein each photograph image overlaps a preceding photograph image and a subsequent photograph image, at an angle of view which is larger than a second angle of view of distribution images;
   receiving a distribution request which specifies any direction in the periphery of the photographing apparatus as a specified direction, wherein the specified direction corresponds to a selected viewing region of the periphery of the photographing apparatus;
   reading out the distribution images in accordance with the specified direction of the distribution request, wherein the distribution images have the second angle of view smaller than the first angle of view, wherein the distribution images are image data for the selected viewing region extracted from each photograph image that contains image data for the selected viewing region, wherein distribution images corresponding to the same selected viewing region are read out from photograph images having different photographing directions; and distributing the distribution images to request destinations of the distribution requests.

5. The image distributing method according to claim 4, in which:

at the step of reading out the distribution image, a plurality of reading start addresses are stored corresponding to a plurality of distribution requests, and the distribution images related to the plurality of reading start addresses are read out; and at the step of distributing the distribution images, the plurality of distribution images are distributed to the respective request destinations.

6. The image distributing method according to claim 4, in which at the step of registering the photograph images, the photograph images are overwritten and recorded to the storing region per a multiple of turns by the photographing apparatus.

7. A computer-readable medium having instructions stored therein which when executed, cause a computer to execute steps of:

storing photograph images that are photographed by rotating a photographing apparatus and continuously photographing a periphery of the photographing apparatus, wherein each photograph image corresponds to a photographing direction and has a first angle of view, wherein each photograph image overlaps a preceding photograph image and a subsequent photograph image, at an angle of view which is larger than a second angle of view of distribution images;

receiving a distribution request which specifies any direction in the periphery of the photographing apparatus as a specified direction, wherein the specified direction corresponds to a selected viewing region of the periphery of the photographing apparatus;

reading out the distribution images in accordance with the specified direction of the distribution request, wherein the distribution images have the second angle of view smaller than the first angle of view, wherein the distribution images are image data for the selected viewing region extracted from each photograph image that contains image data for the selected viewing region, wherein distribution images corresponding to the same selected viewing region are read out from photograph images having different photographing directions; and distributing the distribution images to request destinations of the distribution requests.

8. The storage medium according to claim 7, in which:

at the step of reading out the distribution image, a plurality of reading start addresses are stored corresponding to a plurality of distribution requests, and the distribution images related to the plurality of reading start addresses are read; and at the step of distributing the distribution images, the plurality of distribution images are distributed to the respective request destinations.

9. The storage medium according to claim 7, in which at the step of registering the photograph images, the photograph images are overwritten and recorded to the storing region per a multiple of turns by the photographing apparatus.

10. An image distributing system having a photographing apparatus that is turnably placed and an image distributing apparatus for distributing an image photographed by the photographing apparatus through a network, in which the photographing apparatus includes:

a photographing device continuously photographing an image;

a turning device turning a photograph direction; and an output device outputting a photograph image to the image distributing apparatus, and in which the image distributing apparatus includes:

an image register storing photograph images that are photographed by rotating the photographing apparatus and continuously photographing a periphery of the photographing apparatus, wherein each photograph image corresponds to a photographing direction and has a first angle of view, wherein each photograph image overlaps a preceding photograph image and a subsequent photograph image, at an angle of view which is larger than a second angle of view of distribution images;

a request receiver receiving a distribution request which specifies any direction in the periphery of the photographing apparatus as a specified direction, wherein the specified direction corresponds to a selected viewing region of the periphery of the photographing apparatus;

a reader reading out the distribution images in accordance with the specified direction of the distribution request, wherein the distribution images have the second angle of view smaller than the first angle of view, wherein the distribution images are image data for the selected viewing region extracted from each photograph image that contains image data for the selected viewing region, wherein distribution images corresponding to the same selected viewing region are read out from photograph images having different photographing directions; and a distributor distributing the distribution images to request destinations of the distribution requests.

* * * * *